July 7, 1942. W. K. SONNEMANN 2,289,149
ELECTRICAL RELAY
Filed July 26, 1940 2 Sheets-Sheet 1

WITNESSES:
Edward Michaels
C. L. Freedman

INVENTOR
William K. Sonnemann.
BY
ATTORNEY

July 7, 1942.  W. K. SONNEMANN  2,289,149
ELECTRICAL RELAY
Filed July 26, 1940  2 Sheets-Sheet 2
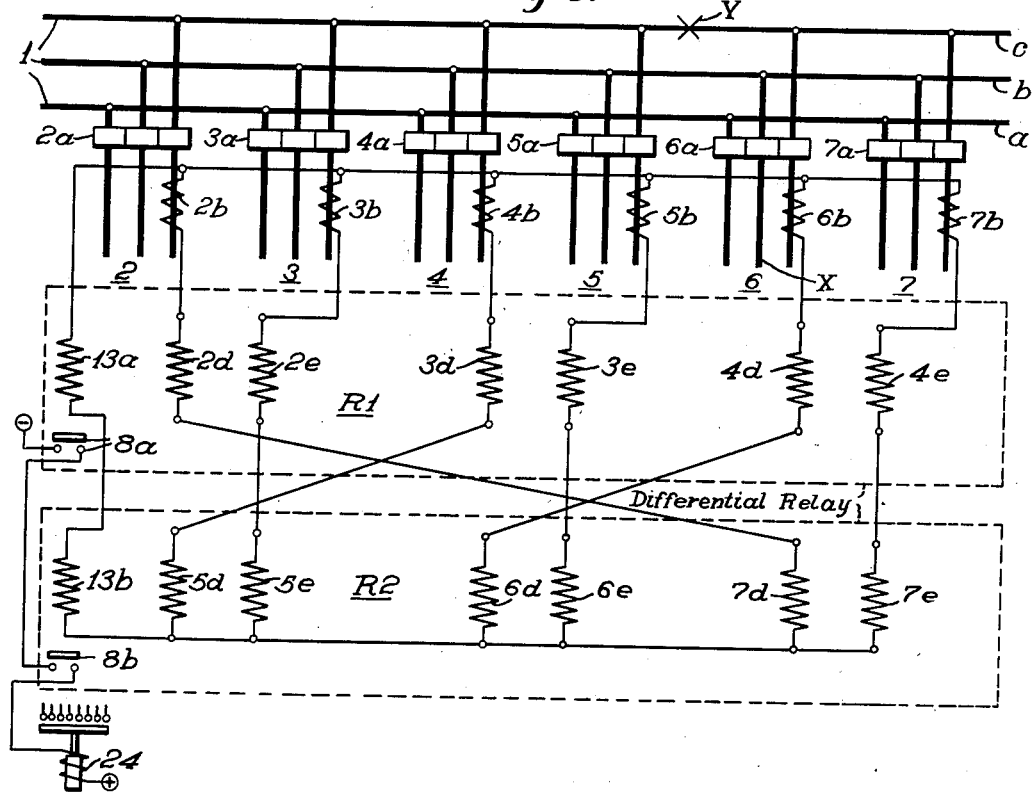
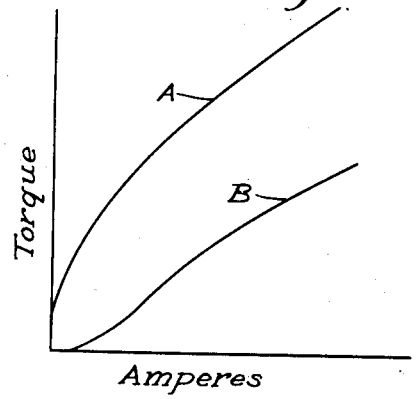
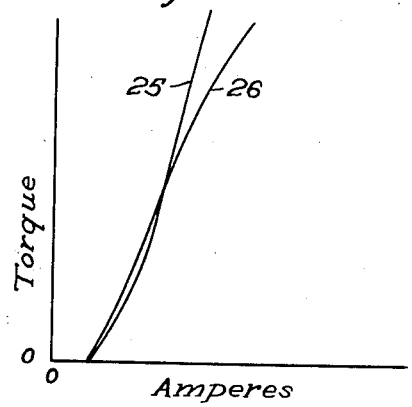
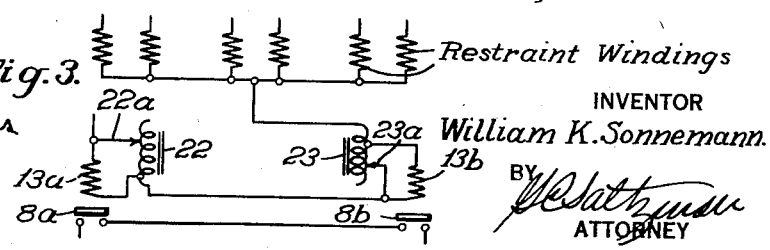
WITNESSES:  INVENTOR
Edward Michaels  William K. Sonnemann.
C. L. Freedman  BY
ATTORNEY

UNITED STATES PATENT OFFICE 2,289,149

ELECTRICAL RELAY

William K. Sonnemann, Roselle Park, N. J., assignor to Westinghouse Electric & Manufacturing Company, East Pittsburgh, Pa., a corporation of Pennsylvania Application July 26, 1940, Serial No. 347,614

20 Claims. (Cl. 175—294)

This invention relates to electrical protective systems, and it has particular relation to electrical protective systems employing percentage differential relays.

In many electrical installations it is desirable to provide a sensitive relay for removing electrical apparatus from service or for otherwise protecting the apparatus when an internal fault occurs therein. If the apparatus is such that electrical current normally enters and leaves the apparatus through a plurality of terminals, the apparatus may be protected by balancing the currents passing through the terminals. Electrical current passing through the apparatus solely by way of the terminals may be referred to as a "through" current. For a "through" current the current entering the apparatus equals that leaving the apparatus through the terminals and no resultant or unbalance current is available. When a fault occurs in the apparatus the current entering the apparatus through the terminals no longer equals that leaving the apparatus through the terminals. Consequently a difference or unbalance current proportional to the current flowing to the fault in the apparatus is obtained by balancing the currents flowing through the terminals, and this difference current may be employed for actuating a relay or other protective device. For example, a relay so actuated may be employed for removing the apparatus from service.

In practice, reliance on difference current alone for actuating the relay is inadvisable. This is for the reason that the relay or other protective device is energized from the terminals through suitable coupling devices such as current transformers. Such current transformers generally have inherent variations which would provide a secondary difference current despite the fact that the currents passing through the terminals are fully balanced.

A further difficulty resides in the possibility of variations in the distribution of current in the terminals. For example, current may enter the apparatus to be protected through a plurality of terminals and leave the apparatus through only one terminal. Since the current transformer associated with the last-named terminal must carry a relatively heavy current, it follows that this transformer may saturate or operate with decreasing permeability. Under these circumstances the secondary current supplied by this transformer to the relay is unable to balance the secondary currents supplied by the remaining transformers to the relay and a false operation of the relay or protective device may result. In other words, the condition of the apparatus or system to be protected is represented by the relationship of the currents flowing through the terminals of the apparatus. These currents may be designated "primary" currents. However, the relay determines this relationship by means of "secondary" currents delivered to the relay by the current transformers associated with the terminals. Consequently, if the secondary currents fail to represent the primary currents faithfully the relay's interpretation of the condition of the apparatus may be incorrect, and an unnecessary relay operation may result. The failure of a secondary current to represent a primary current correctly may be for various reasons such as the saturation of a current transformer caused by excessive primary symmetrical alternating current or by the direct current transient present in certain cases.

In order to prevent false operation of differential relays, it is customary to provide such relays with restraint windings. These restraint windings are energized in accordance with currents passing through the terminals associated with the apparatus to be protected. Consequently, the unbalance or difference current employed for energizing the relay must be sufficient to overcome the restraint imposed by the restraint windings before the relay can operate. Since the restraint increases with an increase in current passing through the terminals, the difference current necessary to operate the relay also must increase. The relationship between operating and restraint currents may be expressed as a percentage. Therefore such a relay generally is designated as a "percentage differential relay" and sometimes as a "ratio differential relay."

In a percentage differential relay, the sensitivity of the relay may be designated by the per cent of restraint or "through" current which must be passed through the operating windings of the relay in order to overcome the restraint imposed by the restraint windings and actuate the relay. This per cent value varies inversely with the sensitivity of the relay. For example, a five per cent relay is more sensitive than a ten per cent relay when the aforesaid system of rating is employed.

Since the restraint provided by the restraint windings and unbalance currents caused by current transformer variations both tend to increase with an increase in "through" current, it follows that the restraint windings tend to prevent false operation of the relay.

When the number of terminals of the apparatus to be protected is large, it is difficult to provide a single relay structure capable of effectively protecting the apparatus. This is for the reason that the number of restraint units associated with a single armature assembly increases with an increase in the number of terminals and requires an undesirably heavy armature structure. This difficulty may be overcome by employing a plurality of differential relay units having their operating contacts so connected that all of the units must operate in order to remove the apparatus from service.

The increase in the number of terminals of the apparatus to be protected creates an additional problem. The restraint offered by restraint windings is dependent to some extent on the number of terminals in service and on the distribution of current in those terminals. Since the possible restraint variation increases with the number of terminals, it follows that the problem is particularly acute for apparatus having a large number of terminals.

The variation in restraint is objectionable for the reason that the sensitivity of the relay must be decreased sufficiently so that the relay will not operate for those normal conditions in which restrain is at a minimum. Lack of sensitivity is objectionable for the reason that the relay fails to respond to small internal fault currents for which operation is desirable.

The variations in restraint in a differential relay may be appreciably decreased by increasing the number of restraint windings and connecting groups of restraint windings for energization in accordance with current passing through a single terminal of the apparatus to be protected. This solution is disclosed in my copending application Serial No. 236,396, filed October 22, 1938, which has issued as Patent 2,246,548. Although this construction represents a marked advance over the prior art, I have found it possible to increase still further the efficiency of a differential relay designed for apparatus having a large number of terminals.

In accordance with this invention, a plurality of percentage differential relay units, each having operating contacts, an operating winding, and a plurality of restraint units are associated for protective purposes. Each of the restraint units is provided with a plurality of restraint widings. A restraint winding of one of the units is connected with the restraint winding of a second relay unit for energization in accordance with the current passing through a single terminal. By connecting the restraint windings of the different units to the same terminals, I have found it possible to decrease the variations in restraint resulting from variations in the number of terminals in service and in the distribution of currents in the terminals.

It is therefore an object of the invention to provide a differential relay of improved sensitivity.

It is a further object of the invention to provide a percentage differential relay having stable restraint characteristics for all conditions of service.

It is a further object of the invention to provide a differential relay assembly having a plurality of differential relay units, each including a restraint winding connected for energization in accordance with current flowing in one terminal of the apparatus to be protected.

It is a further object of the invention to provide a percentage differential relay having a "flared" characteristic with a reduced range of variation in restraint.

It is a still further object of the invention to provide a differential relay having a plurality of relay units for protecting apparatus having a plurality of termnls wherein the relay has a plurality of parallel branch circuits each including a restraint winding on each of the relay units and a current transformer associated with a terminal of the apparatus to be protected.

Other objects of the invention will be apparent from the following description taken in conjunction with the accompanying drawings in which:

Fig. 3 is a diagrammatic view in detail of a modified system for energizing the operating windings of a percentage differential relay.

Fig. 4 is a graphical representation of characteristics of operating and restraint windings suitable for percentage differential relays.

Fig. 5 is a diagrammatic view of a percentage differential relay embodying the invention, and Fig. 6 is a graphic representation of the charactertics of an operating winding suitable for a percentage differential relay.

Figure 1:
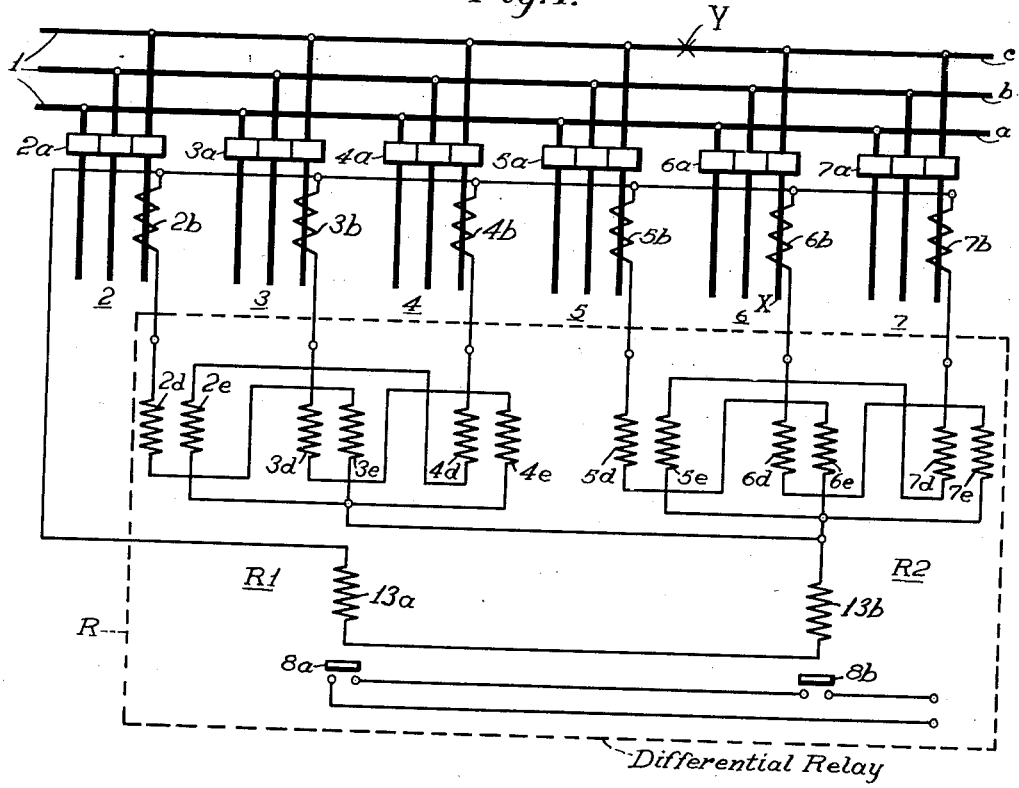
Figure 1 is a diagrammatic view of a percentage differential relay for protecting electrical apparatus.

Referring to the drawings, Figure 1 shows a percentage differential relay associated with apparatus to be protected. This apparatus may comprise various devices such as any generator, motor or transformer apparatus having a plurality of terminals associated therewith, but for the purpose of illustration this apparatus is represented by a bus 1. In the specific embodiment of Fig. 1 the bus 1 is provided with six terminals, 2 to 7, each connected to the bus through a circuit breaker 2a to 7a. Although the relays described herein are applicable to various electrical systems such as single-phase or polyphase systems, the invention is described for a three-phase system having three phase conductors a, b and c. In order to simplify the description, differential relay protection is disclosed for phase c only. For energizing such a relay, phase c of each of the terminals is provided with a current transformer 2b to 7b.

The terminals 2 to 7 represent the terminals of various feeder, generator or tie-circuits or combinations of such circuits which are connected to the bus. For example, the terminals 2 and 3 may represent the connections of generator circuits capable of supplying power to the bus. The terminals 4, 5 and 7 may represent tie-circuits which are capable of supplying power to or from the bus as conditions warrant. The terminal 6 may represent a feeder circuit for supplying power from the bus.

Protection for the bus 1 is provided by a percentage differential relay R comprising two relay units R1 and R2. The relay unit R1 includes three pairs of restraint windings 2d and 2e, 3d and 3e and 4d and 4e. Similarly the relay unit R2 is provided with three similar pairs of restraint windings 5d and 5e, 6d and 6e, and 7d and 7e. In addition, the units are provided, respectively, with operating contacts 8a and 8b and with operating windings 13a and 13b.

The relay units R1 and R2 may be identical. A suitable construction for the relay unit R1 is illustrated in Fig. 2.

Figure 2:
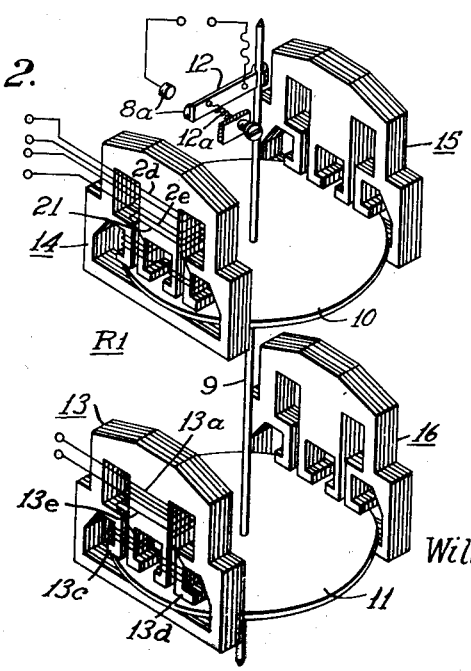
Fig. 2 is a view in perspective of a differential relay unit suitable for the relay of Fig. 1.

Referring to Fig. 2, the relay unit R1 includes an armature assembly having a rotatably mounted shaft 9, an electro-conductive armature disk 10, and an electro-conductive armature disk 11. The shaft 9 may carry an arm 12 for operating the contacts 8a. Rotation of the shaft in one direction operates to close the contacts 8a, whereas rotation of the shaft in an opposite direction tends to separate the contacts 8a.

Rotation of the armature assembly is effected by four electromagnets 13 to 16, two of the electromagnets being provided for each of the armature disks. One of the electromagnets, such as the electromagnet 13, is provided with a main pole about which the operating winding 13a is located. The lower end of the main pole is split and is associated with cooperating poles 13c and 13d. A short-circuited winding 13e has portions surrounding the main pole and the cooperating poles 13c and 13d. When alternating current flows in the operating winding 13a an induced current flows in the short-circuited winding 13e. These windings cooperate to produce a shifting magnetic field in an air gap within which the disk 11 is positioned. The operation of the electromagnet 13 is well known in the art.

The electromagnet 13 is designed preferably to rotate the armature assembly in a direction to close the contacts 8a. These contacts normally may be biased to their open condition by means of an adjustable spring 12a.

The electromagnet 14 resembles the electromagnet 13. However, the electromagnet 14 represents a restraint unit, and is provided with two windings 2d and 2e in place of the one winding 13a of the electromagnet 13. The short-circuited winding 21 of the electromagnet 14 corresponds to the short-circuited winding 13e of the electromagnet 13. It will be understood that when each or both of the windings 2d and 2e are properly energized by alternating current, a shifting magnetic field is produced which tends to rotate the armature disk 10. The electromagnet 14 is designed to produce a magnetic field tending to rotate the armature assembly in a direction suitable for separating the contacts 8a. The electromagnets 15 and 16 are similar to the electromagnet 14.

In Fig. 1 it will be noted that the contacts 8a and 8b are connected in series. For this reason closure of both of the contacts 8a and 8b is necessary to complete an operating circuit for tripping the circuit breakers 2a to 7a or for any other desired operation.

By tracing the circuits in Fig. 1, it may be observed that each of the current transformers is connected to two of the restraint windings. For example, the current transformer 2b is connected to the restraint windings 2d and 3e. As a further example, the current transformer 3b is connected to the restraint windings 3d and 4e. Each of the current transformers and its associated restraint windings form one branch of a parallel circuit having seven branches. The operating windings 13a and 13b form the remaining branch of this parallel circuit.

It is believed that the operation of the circuit illustrated in Fig. 1 is apparent from the foregoing description. Under normal operating conditions, the current entering the bus 1 through the terminals equals that leaving the bus through the terminals. Since the current entering the bus through the terminals normally equals that leaving the bus through the terminals, it follows that the currents in the secondaries of the current transformers 2b to 7b balance and substantially no current flows through the operating windings 13a and 13b. Consequently the contacts 8a and 8b remain open.

If a fault external to the bus occurs as at the point X on the terminal 6, a substantial flow of current may pass through the bus towards the point X. However, the same condition is present; namely, current entering the bus through the terminals equals that leaving the bus through the terminals. If the characteristics of the current transformers do not vary appreciably under these conditions, and assuming that all current transformers have the same transformation rates, substantially no current flows through the operating windings 13a and 13b, and the contacts 8a and 8b remain open. Even though some unbalance be present in the outputs of the current transformers due to saturation of a transformer carrying appreciable current, such as the transformer 6b, the restraint windings tend to prevent closure of the contacts 8a and 8b.

If a fault occurs on the bus 1 as at the point Y, the current entering the bus through the terminals no longer equals that leaving the bus through the terminals. The difference between these currents represents the current flowing to the fault at the point Y. Since this unbalance appears in the outputs of the current transformers supplying current to the differential relay, it follows that a substantial current flows through the operating windings 13a and 13b. Under these conditions the torques exerted by the operating windings 13a and 13b on their armature assemblies should be sufficient to overcome the restraint torque and should result in a closure of the contacts 8a and 8b.

The differential relay illustrated in Figs. 1 and 2 is similar to that disclosed in my aforesaid copending application. For a more complete description of this relay, reference may be made to the aforesaid application.

Although the relay illustrated in Fig. 1 is entirely operated as thus far described, still further improvements may be effected by providing the relay with a "flared" characteristic. As disclosed in the copending application of W. K. Sonnemann et al., Serial No. 236,397, filed October 22, 1938, which has matured into Patent 2,240,677, a "flared" characteristic may be obtained by energizing the operating winding of a percentage differential relay through a transformer which saturates or operates with decreasing permeability as the energizing current increases. Similar characteristics may be provided for the relay units R1 and R2 by designing the electromagnets for the operating windings 13a and 13b to saturate or operate with decreasing permeability as their energizing currents increase.

Connections employing saturating auxiliary transformers for providing a "flared" characteristic are illustrated in Fig. 3 wherein the unbalance or difference current is conducted from the restraint windings through the primary of two auxiliary current transformers 22 and 23. These transformers are designed to saturate or operate with decreasing permeability when their energizing currents rise above predetermined values. The operating windings 13a and 13b are connected respectively across the secondaries of the transformers 22 and 23. In the specific illustration, the auxiliary transformers are autotransformers having adjustable taps 22a and 23a. This construction provides a desirable characteristic for the reason that after saturation the auto-transformers operate somewhat like impedance voltage dividers.

The effect of the "flared" characteristic is to make the relay more sensitive for low values of restraint current (such as values corresponding to normal load currents for the system) than for higher values of restraint current. Consequently the relay trips properly on internal faults involving small current magnitudes. At the same time the relay does not trip for external faults involving large current magnitudes, which cause one or more of the terminal current transformers to depart substantially from their correct transformation ratios.

It should be noted that by employing only one of the restraint windings on each of the restraint electromagnets, the relay illustrated in Fig. 2 may be employed in a conventional manner for protecting an electrical system having three terminals.

It will be noted that a variety of conditions may obtain for the bus shown in Fig. 1. For example, current may be supplied to the bus through five terminals, 2, 3, 4, 5 and 7, and may leave the bus through a single terminal 6. Furthermore, certain of the terminals may be out of service under certain conditions. Because of these and other variations, the restraint offered by the restraint windings is not always the same for a given total current flow. This may be illustrated more clearly by a numerical example.

Let it be assumed that current leaves the bus 1 through a single terminal 6 to a fault at the point X, and that the current through the terminal 6 has a value of 75 amperes referred to the secondary of the current transformer 6b. Let it be assumed further that the current transformer 6b saturates so that it delivers only 65 amperes. Since the current supplied to the bus is divided among a number of terminals, it may be assumed that the remaining current transformers hold their ratios.

The operating characteristics of the operating and restraining windings are illustrated in Fig. 4 wherein ordinates represent torque in centimeter grams developed by the windings, and abscissae represent amperes at 60 cycles supplied to the windings. Curves A and B represent an operating winding and a restraint winding respectively. By determining the current supplied to each winding for various connections of the terminals supplying current to the fault on the terminal 6, for the specific example, it will be found that the restaining torque in the relay unit developing the maximum restraining torque will vary from approximately 48 to 105 centimeter grams. This means that the differential relay must be made sufficiently insensitive so that the operating winding of each relay unit will not develop a torque of more than 48 centimeter grams under external fault conditions due to the unbalance currents resulting from saturation of current transformers or from other reasons.

If the same calculations are carried out for an internal fault as at the point Y, it will be found that the restraining torque will vary from approximately 50 to 105 centimeter grams depending upon the distribution of current in the terminals. These computations are again made for a fault current of 75 amperes referred to the secondary of a current transformer.

In order to be sure of positive tripping for the internal fault, it follows that the differential relay must have a sensitivity sufficient to develop over 105 centimeter grams of operating torque. This sensitivity is required despite the fact that under certain current distributions about 51 centimeter grams of operating torque suffice to actuate the differential relay.

Although the differential relay illustrated in Fig. 1 is very satisfactory, I have found it possible to decrease still further the variations in restraining torque resulting from the variations in current distribution. A differential relay arranged in accordance with the invention is illustrated in Fig. 5.

Referring to Fig. 5, the two relay units R1 and R2 are connected to the current transformers 2b to 7b in a somewhat different manner. In Fig. 1 the restraint units of each relay unit are associated with only three terminals. In Fig. 5, on the other hand, the restraint units of each relay unit are associated with all of the current transformers. This means that each current transformer is connected to a restraint winding in each of the relay units.

By inspection of Fig. 5, it will be observed that the restraint windings on each restraint unit are connected to different current transformers. The pairing of current transformers preferably differs for each restraint unit. Moreover, each of the current transformers is associated with a different group of restraint units. In Fig. 5, a seven branch parallel circuit is illustrated in which each of six branches includes a current transformer and a restraint winding positioned in each of the relay units. For example, the current transformer 2b is connected in series with the restraint winding 2d and the restraint winding 7d. As a further example, the current transformer 3b is connected in a series circuit including the restraint winding 2e and the restraint winding 5e. The operating windings 13a, 13b are in the seventh branch of the parallel circuit. Although the relay of Fig. 5 may be employed without a "flared" characteristic, preferably such a characteristic is provided.

The improvement effected by redistributing the restraint windings relative to the current transformers may be shown by making equivalent computations for the relay of Fig. 5. These computations again are based on a total fault current of 75 amperes referred to the secondary side of the current transformers. For the external fault at the point X, the relay of Fig. 5 is found to have a restraint in the relay unit developing maximum restraint torque which varies from 42 to 95 centimeter grams. It will be observed that for external faults the relay of Fig. 5 is slightly better than the relay of Fig. 1 through having a smaller range between maximum and minimum restraint torques.

For an internal fault at the point Y, of 75 amperes referred to the secondary side of the current transformers, it is found that the restraint torque varies only from 44 to 50 centimeter grams. This means that to assure tripping on such an internal fault the operating windings of the relay units need develop a torque of but slightly over 50 centimeter grams. Because of this great reduction in required torque, the differential relay of Fig. 5 may be made much more insensitive than the relay of Fig. 1 to external faults, without impairing the protection for internal faults. Greater insensitivity to external faults is desirable for the reason that the relay should not operate for such faults. The greater insensitivity is an additional safeguard against false relay operations caused by faulty current transformer performance.

As illustrated in Fig. 5, the contacts 8a and 8b may be employed for connecting a source of power (represented by polarity markings) to a suitable translating device 24 which may be employed for actuating trip coils for the circuit breakers, alarm devices or any other suitable protective devices.

In some special cases discrimination should be exercised in connecting the relay of Fig. 5 to the system to be protected. For example, if the terminals 2, 4 and 6 represent tie lines connected to a distant substation bus, a fault on the substation bus might produce substantially equal currents flowing through the terminals 2, 4 and 6. If current supplied to the bus 1 through the terminals 3, 5 and 7 divides substantially uniformly among the terminals 3, 5 and 7, it will be noted that substantially no restraint will be offered in either of the relay units R1 or R2. For example, since current flows in opposite directions through the terminals 2 and 3, the current passing through the winding 2d neutralizes the effect of the current passing through the restraint winding 2e. A similar condition will be found to obtain for each of the remaining pairs of the restraint windings. For this reason care should be exercised to prevent the cancellation of all restraint. In the particular example cited, the cancellation of restraint may be prevented by connecting the terminals 5, 6 and 7 to the distant substation bus.

As an example of a relay application wherein a high sensitivity is desirable, reference may be made to an electrical system which has its neutral grounded through a high impedance. In such a system, an internal fault to ground may result in the flow of a relatively small fault current. Despite the small fault current, the relay employed for protecting the system should operate. The increased overall sensitivity available in a relay embodying this invention facilitates proper operation of the relay under such exacting conditions.

By adjusting the bias exerted by the spring 12a, the minimum sensitivity of the relay units may be varied to meet varied local conditions. For example, if a power transformer is located in the zone to be protected a moderate spring bias may be employed for decreasing the tendency of the relay to trip on magnetizing inrush current required by the transformer.

Typical characteristics of an operating winding 13a or 13b are illustrated in Fig. 6 wherein abscissae represent current flowing through the energizing circuit for the operating winding and ordinates represent torque available for overcoming the torque of the restraint windings. Two curves 25 and 26 are shown. The curve 25 represents a tap connection for a saturating auxiliary transformer 22 or 23 such that 12 amperes through the energizing circuit for the operating winding just suffices to overcome a restraint torque of 70 centimeter grams. In the specific relay represented by the curves, such a restraint torque is obtained from a heavy internal fault. Similarly, the curve 26 represents a tap connection such that 38 amperes through the energizing circuit for the operating winding suffices to overcome the restraint torque of 70 centimeter grams. Other taps may be provided as desired.

Fig. 6 is purposely drawn to show low current values. It will be observed that for very low current values the curves exhibit a very small spread. In other words, all taps provide substantially the same sensitivity for small internal faults. For larger fault currents the curves show an appreciable spread. The selection of the proper tap for operation is determined by local conditions.

The displacement of the curves from the intersection of the axes represents the effect of the torque exerted by the spring 12a. In some cases this spring torque advantageously may be increased. For example, if a power transformer is within the system to be protected, substantial magnetizing inrush current may be required by the transformer. An increased spring torque, especially when provided in a relay having a "flared" characteristic, will reduce the tendency of the differential relay to trip in response to the magnetizing inrush current.

Although the invention has been described with reference to certain specific embodiments thereof, it is obvious that numerous modifications are possible. Therefore, the invention is to be restricted only by the appended claims when interpreted in view of the prior art.

I claim as my invention:

1. In a relay system, a plurality of restraint units, a plurality of energizing sources for said restraint units, each of said energizing sources being connected to energize a different pair of said restraint units, a separate operating unit for each restraint unit of one of said pairs of restraint units, and control means responsive to the combined conditions of each of said operating units and its associated restraint unit.

2. In a differential relay system, three restraint units, two windings for each of said restraint units, six energizing sources, each of said sources being connected for energizing a separate one of said windings, and a common operating unit for said restraint units.

3. In a protective arrangement for an electrical system having a plurality of terminals through which currents normally enter and leave said system, a plurality of groups of restraint means, each of said groups of restraint means being connected for energization in accordance with the current flowing through one of said terminals, separate operating means for each restraint means in one of said groups connected for energization in accordance with current leaving said system by a path other than said terminals, and control means responsive to the combined conditions of said restraint and operating means.

4. In a protective arrangement for an electrical system having a plurality of terminals through which currents normally enter and leave said system, a plurality of groups of restraint means, each of said groups of restraint means being connected for energization in accordance with the current flowing through a separate one of said terminals, separate operating means for each restraint means in one of said groups, said operating means being connected for energization in accordance with current leaving said system by a path other than said terminals, and control means responsive to the combined conditions of said restraint and operating means, said means being so proportioned that the ratio of energization of said operating means to the energization of said restraint means necessary to effect an operation of said control means increases with an increase in energization of said restraint means.

5. In a protective arrangement for an electrical system having a plurality of terminals through which currents normally enter and leave said system, a plurality of groups of restraint means, each of said groups of restraint means being connected for energization in accordance with the current flowing through one of said terminals and each of said restraint means being connected for energization in accordance with currents flowing in a distinct group of said terminals, separate operating means for each restraint means in one of said groups, said operating means being connected for energization in accordance with current leaving said system by a path other than said terminals, and control means responsive to the combined conditions of said restraint and operating means.

6. In a protective arrangement for an electrical system having a plurality of terminals through which currents normally enter and leave said system, a plurality of groups of restraint means, each of said groups of restraint means being connected for energization in accordance with the current flowing through one of said terminals and each of said restraint means being connected for energization in accordance with currents flowing in a distinct group of said terminals, separate operating means for each restraint means in one of said groups, said operating means being connected for energization in accordance with current leaving said system by a path other than said terminals, and control means responsive to the combined conditions of said restraint and operating means, said means being so proportioned that the ratio of energization of said operating means to the energization of restraint means necessary to effect an operation of said control means increases with an increase in energization of said restraint means.

7. In a protective arrangement for an electrical system having a plurality of terminals through which currents normally enter and leave said system, a current transformer for each of said terminals for providing a source of current dependent on the current flowing through the terminal associated therewith, a plurality of groups of restraint means, each of said groups of restraint means being connected for energization in accordance with the secondary current flowing in one of said current transformers, separate operating means for each restraint means in one of said groups, said operating means being connected for energization in accordance with current flowing to a fault occurring in said system, and control means responsive to the combined conditions of said restraint and operating means.

8. In a protective arrangement for an electrical system having a plurality of terminals through which currents normally enter and leave said system, a current transformer for each of said terminals for providing a source of current dependent on the current flowing through the terminal associated therewith, a plurality of groups of restraint means, each of said groups of restraint means being connected for energization in accordance with the secondary current flowing in a separate one of said current transformers, separate operating means for each restraint means in one of said groups, said operating means being connected for energization in accordance with current flowing to a fault occurring in said system, and control means responsive to the combined conditions of said restraint and operating means, said means being so proportioned that the ratio of energization of said operating means to the energization of restraint means necessary to effect an operation of said control means increases with an increase in energization of said restraint means.

9. In a protective arrangement for an electrical system having a plurality of terminals through which currents normally enter and leave said system, a current transformer for each of said terminals for providing a source of current dependent on the current flowing through the terminal associated therewith, a plurality of groups of restraint means, each of said groups of restraint means being connected for energization in accordance with the secondary current flowing in one of said current transformers, and each of said restraint means being connected for energization in accordance with currents flowing in the secondary windings of a distinct group of said current transformers, separate operating means for each restraint means in one of said groups, said operating means being connected for energization in accordance with current flowing to a fault occurring in said system, and control means responsive to the combined conditions of said restraint and operating means.

10. In a protective arrangement for an electrical system having a plurality of terminals through which currents normally enter and leave said system, a current transformer for each of said terminals for providing a source of current dependent on the current flowing through the terminal associated therewith, a plurality of groups of restraint means, each of said groups of restraint means being connected for energization in accordance with the secondary current flowing in one of said current transformers, and each of said restraint means being connected for energization in accordance with currents flowing in the secondary windings of a distinct group of said current transformers, separate operating means for each restraint means in one of said groups, said operating means being connected for energization in accordance with current flowing to a fault occurring in said system, and control means responsive to the combined conditions of said restraint and operating means, said means being so proportioned that the ratio of energization of said operating means to the energization of said restraint means necessary to effect an operation of said control means increases with an increase in energization of said restraint means.

11. In a protective arrangement for an elecrical system having a plurality of terminals through which currents normally enter and leave said system, a current transformer for each of said terminals for providing a source of current dependent on the current flowing through the terminal associated therewith, a plurality of differential relay units each comprising control means, restraint units each having a plurality of restraint windings and an operating winding for actuating said control means, means for connecting restraint windings on different relay units for energization from the secondary of one of said current transformers, means for energizing each of said operating windings in accordance with current flowing to a fault occurring in said system, and controlled means operable to a predetermined condition by said control means only when all of said control means are in their control conditions.

12. In a protective arrangement for an electrical system having a plurality of terminals through which currents normally enter and leave said system, a current transformer for each of said terminals for providing a source of current dependent on the current flowing through the terminal associated therewith, a plurality of differential relay units each comprising contact means, a plurality of restraint windings and an operating winding for controlling said contact means, means for connecting a separate group of restraint windings for energization from each of said current transformers, the restraint windings of each of said groups being associated with different relay units, means for energizing each of said operating windings in accordance with current flowing to a fault occurring in said system, said contact means being connected in series for effecting a control operation, and each of said relay units being so constructed that the ratio of energization of its operating winding to the energization of its restraint windings necessary to effect an operation of said contact means increases with an increase in energization of said restraint windings.

13. In a protective arrangement for an alternating current electrical system having a plurality of terminals through which currents normally enter and leave said system, a current transformer for each of said terminals for providing a source of current dependent on the current flowing through the terminal associated therewith, and a plurality of differential relay units each having a plurality of pairs of restraint windings, said restraint windings being arranged in groups each comprising a restraint winding on each of said relay units, having an operating winding connected for energization in accordance with current flowing to a fault occurring in said system, and having contact means controlled by said restraint and operating windings, the contact means of said relay units being connected in series, and means for connecting each of said groups for energization from a separate one of said current transformers, said relay units being so proportioned that the ratio of energization for said operating windings to the energization for said restraint windings necessary for actuating said contact means increases with increase in the energization of said restraint windings.

14. In a protective arrangement for an electrical system having a plurality of terminals through which currents normally enter and leave said system; a plurality of differential relay units each comprising an electroconductive armature assembly mounted for rotation, electromagnetic operating means inductively associated with said armature assembly, said operating means being effective when energized for urging said armature assembly in a first direction of rotation, and a plurality of restraint means each including an electromagnet inductively associated with said armature assembly and having a plurality of energizing windings, said electromagnet being effective when energized for opposing rotation of said armature assembly in said first direction; means for connecting a group of said windings comprising one of said windings on each of said relay units for energization in accordance with current passing through a separate one of said terminals; means connecting said operating means for energization in accordance with a function of the difference between currents entering and leaving said system through said terminals, and means effective for initiating a control operation only when each of said armature assemblies is in a predetermined position.

15. In a protective arrangement for an electrical system having a plurality of terminals through which currents normally enter and leave said system and having a current transformer associated with each of said terminals for providing a source of current dependent on the current flowing through the associated terminal; a plurality of differential relay units each comprising an electroconductive armature assembly mounted for rotation, electromagnetic operating means inductively associated with said armature assembly, said operating means being effective when energized for urging said armature assembly in a first direction of rotation, and a plurality of restraint means each including an electromagnet inductively associated with said armature assembly and having a plurality of energizing windings, said electromagnet being effective when energized for opposing rotation of said armature assembly in said first direction; means for connecting a group of said windings comprising one of said windings on each of said relay units for energization in accordance with current passing through a separate one of said current transformers; means connecting said operating means for energization from said current transformers in accordance with a function of the difference between currents entering and leaving said system through said terminals, and means effective for initiating a control operation only when each of said armature assemblies is in a predetermined position.

16. In a protective arrangement for an electrical system having a plurality of terminals through which currents normally enter and leave said system and having a current transformer associated with each of said terminals for providing a source of current dependent on the current flowing through the associated terminal; a plurality of differential relay units each comprising an electroconductive armature assembly mounted for rotation, electromagnetic operating means inductively associated with said armature assembly, said operating means being effective when energized for urging said armature assembly in a first direction of rotation, and a plurality of restraint means each including an electromagnet inductively associated with said armature assembly and having a plurality of energizing windings, said electromagnet being effective when energized for opposing rotation of said armature assembly in said first direction; means for connecting a group of said windings comprising one of said windings on each of said relay units for energization in accordance with current passing through a separate one of said current transformers; means connecting said operating means for energization from said current transformers in accordance with a function of the difference between currents entering and leaving said system through said terminals; and means effective for initiating a control operation only when each of said armature assemblies is in a predetermined position; each of said relay units being so proportioned that the ratio of energization of its operating means to energization of its restraint means necessary to actuate its armature assembly to said predetermined position increases with an increase in energization of said restraint means.

17. In a protective arrangement for an electrical system having a plurality of terminals through which currents normally enter and leave said system and having a current transformer associated with each of said terminals for providing a source of current dependent on the current flowing through the associated terminal; a plurality of differential relay units each comprising an electroconductive armature assembly mounted for rotation, electromagnetic operating means inductively associated with said armature assembly, said operating means being effective when energized for urging said armature assembly in a first direction of rotation, and a plurality of restraint means each including an electromagnet inductively associated with said armature assembly and having a plurality of energizing windings, said electromagnet being effective when energized for opposing rotation of said armature assembly in said first direction; means for connecting a group of said windings comprising one of said windings on each of said relay units for energization in accordance with current passing through a separate one of said current transformers, the grouping of current transformers employed for energizing each one of said electromagnets differing from the grouping of current transformers employed for energizing each of the remaining electromagnets, means connecting said operating means for energization from said current transformers in accordance with a function of the difference between currents entering and leaving said system through said terminals, and means effective for initiating a control operation only when each of said armature assemblies is in a predetermined position.

18. In a protective arrangement for an electrical system having a plurality of terminals through which currents normally enter and leave said system, a current transformer for each of said terminals for providing a source of current dependent on the current flowing through the terminal associated therewith, a plurality of differential relay units each comprising control means, restraint units each having a plurality of restraint windings and an operating winding for actuating said control means, means for connecting each secondary of said current transformers for energizing a separate restraint winding in each of said relay units, means for energizing each of said operating windings in accordance with current flowing to a fault occurring in said system, and controlled means operable to a predetermined condition by said control means only when all of said control means are in their control conditions.

19. In a protective arrangement for an electrical system having a plurality of terminals through which currents normally enter and leave said system, a current transformer for each of said terminals for providing a source of current dependent on the current flowing through the terminal associated therewith, a plurality of differential relay units each comprising control means, restraint units each having a plurality of restraint windings and an operating winding for actuating said control means, means for establishing an electrical circuit having a plurality of parallel branches, each of said branches including a restraint winding on each of said relay units and a secondary winding of one of said current transformers, means for connecting said operating windings in parallel with said branches, and controlled means operable to a predetermined condition by said control means only when all of said control means are in their control conditions.

20. In a protective arrangement for an electrical system having a plurality of terminals through which currents normally enter and leave said system, current transformers associated with said terminals, a differential relay having operating means effective when energized for urging said relay to a first condition, said relay having a plurality of restraint means effective when energized for opposing operation of said relay to said first condition, means connecting each of said restraint means for energization in accordance with current passing through a separate one of said terminals, and means for energizing said operating means, said last-named energizing means comprising a current auto-transformer designed to saturate within the expected range of energization thereof, means connecting said operating means for energization in accordance with the output of said auto-transformer, and means including said current transformers associated with said terminals for energizing said auto-transformer substantially in accordance with the difference between currents entering and leaving said system through said terminals.

WILLIAM K. SONNEMANN.